United States Patent

Fitzgerald, Jr. et al.

[15] 3,688,031

[45] Aug. 29, 1972

[54] HORIZONTAL OSCILLATOR DISABLING

[72] Inventors: William Vincent Fitzgerald, Jr.; Paul Carleton Wilmarth, both of Indianapolis, Ind.

[73] Assignee: RCA Corporation

[22] Filed: May 18, 1971

[21] Appl. No.: 144,457

[52] U.S. Cl.............................178/7.5 R, 315/27 TD

[51] Int. Cl................................................H04n 5/44

[58] Field of Search............178/7.3 R, 7.5 R, 7.5 DC, 178/DIG. 11315/27 TD

[56] References Cited

UNITED STATES PATENTS

| | | | |
|---|---|---|---|
| 3,546,536 | 12/1970 | Soumin | 178/7.3 R |
| 3,560,650 | 2/1971 | Hofmann | 178/7.5 R |
| 3,569,621 | 3/1971 | Krug | 178/7.5 R |

*Primary Examiner*—Robert L. Griffin
*Assistant Examiner*—George G. Stellar
*Attorney*—Eugene M. Whitacre

[57] ABSTRACT

Pending U.S. Pat. Applications Ser. Nos. 103,713 and 121,250 disclose high voltage protection circuits which change the frequency of the horizontal oscillator of a television receiver in response to an indication of increase in the ultor potential developed for its picture tube which could cause danger of X-radiation. Whereas the circuits of such disclosures operate to change a voltage in the horizontal oscillator to which a capacitor is required to charge in establishing the oscillator frequency, the circuit of the instant invention operates to vary a resistance which, together with a capacitor of this type, sets the time constant which determines such frequency.

6 Claims, 1 Drawing Figure

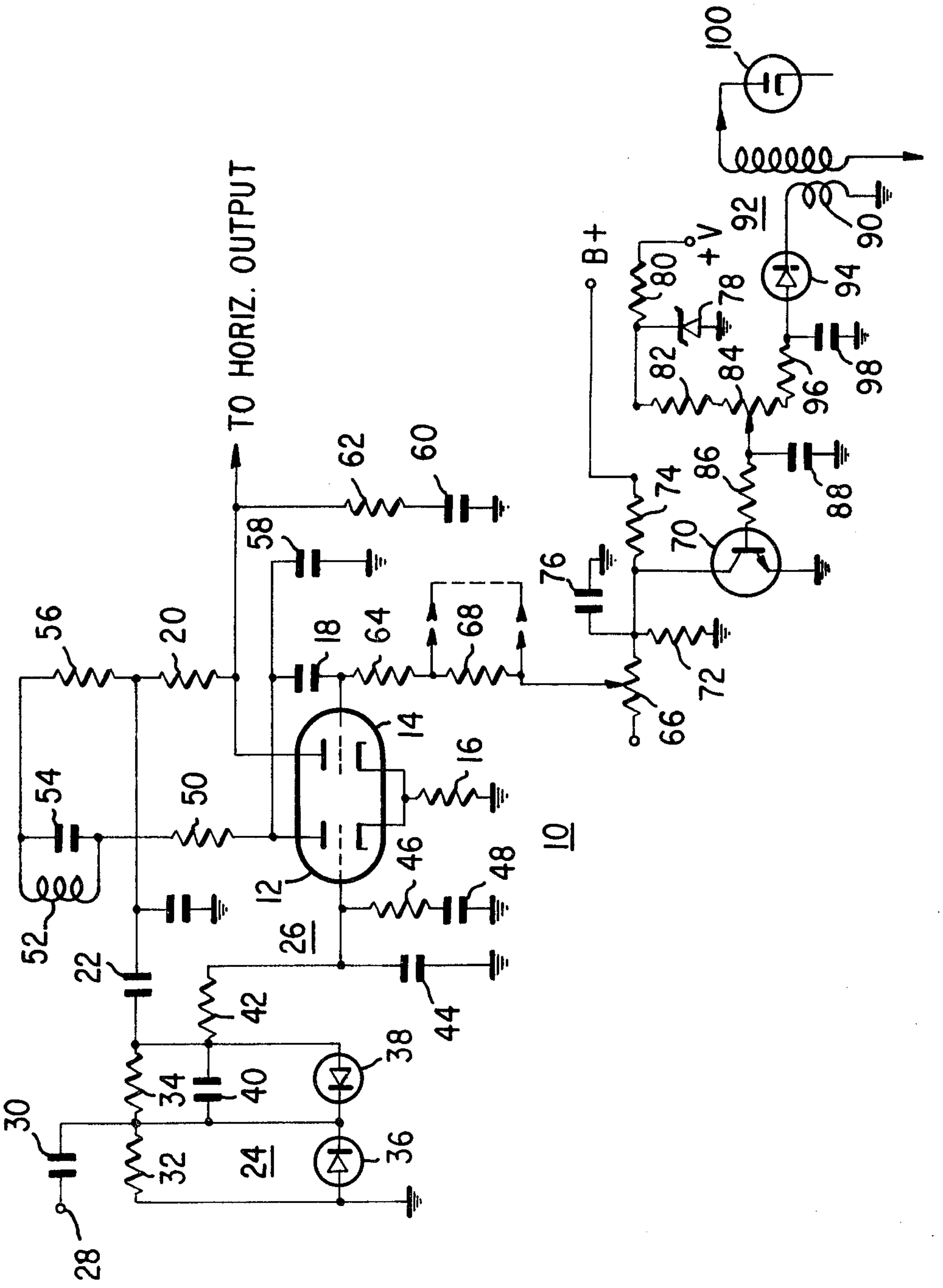
INVENTORS.
WILLIAM V. FITZGERALD, JR
PAUL C. WILMARTH
BY Charles Brodsky
ATTORNEY

HORIZONTAL OSCILLATOR DISABLING

FIELD OF INVENTION

This invention relates to television receivers, in general, and to its horizontal oscillator circuit which produces a voltage waveform used in developing an ultor potential necessary for image reproduction, in particular.

SUMMARY OF THE INVENTION

As will become clear hereinafter, the circuit of the present invention senses a particular operating condition in the receiver as indicative of the high voltage developed for its picture tube. During normal operation, the development of this high voltage is such that the circuit provides a zero control effect; but, upon detecting the development of this high voltage to a level beyond a prescribed amount, the circuit responds to provide a control signal which changes the frequency of the horizontal oscillator and renders the reproduced picture unviewable.

One preferred embodiment of the invention will be seen to employ a transistor and a zener diode reference to cooperatively detect these high voltage increases, with the transistor being initially saturated for high voltages below this prescribed level. The horizontal hold control of the oscillator combines with the collector-to-emitter impedance of the transistor at this time to establish a first R-C time constant with the capacitor providing the desired oscillator frequency. However, when the high voltage increases beyond this level to a value at which the corresponding increase can produce X-radiation, a rectifier and filter combination cooperate to render the transistor non-conductive; as a result, the collector-to-emitter impedance of the transistor will vary, and in combination with the horizontal hold control, change the R-C time constant and the oscillator frequency. The receiver will thus lose horizontal synchronization and the reproduced picture become unviewable.

As such, the described configuration is similar to protective arrangements disclosed in the pending U. S. Pat. Applications, Ser. No. 103,713, filed Jan. 4, 1971 and Ser. No. 121,250, filed Mar. 29, 1971 . These applications describe circuits which also change the operating frequency of the horizontal oscillator in the presence of high voltage fault conditions. The constructions there described as adjusting the oscillator frequency operate, however, not to change any R-C time constant in the oscillator, but to change, instead, the voltage to which the capacitive element charges. While such configurations operate satisfactorily for the transistorized horizontal oscillator networks there shown, the embodiment of the invention described below is more adaptive to the astable type of oscillator multivibrator oftentimes used in vacuum tube designs. One such oscillator may be the arrangement shown in the publication of the RCA Sales Corporation describing its KCS–179 monochrome receiver under the file designation 1971, No. T—11.

BRIEF DESCRIPTION OF THE DRAWING

These and other advantages of the present invention will be more clearly understood from a consideration of the single figure of the drawing showing, in schematic form, a horizontal oscillator stage for a monochrome television receiver including a protection circuit constructed in accordance with the invention.

DETAILED DESCRIPTION OF THE DRAWING

In the drawing, the horizontal oscillator stage 10 is of appropriate astable design employing a pair of triode sections 12, 14, which may characteristically comprise half sections of a single vacuum tube such as an 8FQ7/8 CG7. As shown, the cathodes of the two sections are joined at a junction point 15, and returned to a reference or ground potential by means of a common resistor 16. The plate of section 12 is cross-coupled to the grid of section 14 via a capacitor 18, while the plate of section 14 is cross-coupled to the grid of section 12 via a resistor 20, a capacitor 22, a phase detector circuit 24 and a filter circuit 26.

In particular—and as will be seen below—oscillator voltage waveforms are developed at the end of resistor 20 remote from the plate of section 14 and are compared with a horizontal synchronizing pulse supplied at an input terminal 28 to develop a direct control voltage at the grid of triode section 12 which is indicative of any phase difference that might exist between the two compared waveforms. The horizontal synchronizing pulse is applied from terminal 28 to the phase detector 24 via a capacitor 30 coupled to the junction of a pair of resistors 32, 34 and to the joined cathode electrodes of a pair of semi-conductor rectifiers 36, 38, the anode electrodes of which are returned to the illustrated opposite ends of the resistors 32, 34. The anode of rectifier 36 is also shown connected to ground potential, while a further capacitor 40 is connected, first of all, in shunt with the rectifier 38, and second of all, via a resistor 42 to the grid of triode section 12. A capacitor 44 is also coupled to the grid to provide a filtering action with resistor 42, which is supplemented by a further filtering from the series combination of a resistor 46 and a capacitor 48, also coupling the grid of section 12 to ground.

As further shown, the plate of triode section 12 is coupled via a resistor 50 and a tank circuit comprising a variable inductor 52 and a capacitor 54 to a resistor 56 which connects at its other end to the resistor 20 coupled to the plate of triode section 14. A pair of capacitors 58 and 60, are further included, with capacitor 58 directly coupling the plate of section 12 to ground and with capacitor 60 similarly coupling the plate of section 14 to ground, but via a series connection with a resistor 62. Lastly, the oscillator stage 10 includes a resistor 64 serially coupled between the grid of section 14 and the variable arm of a horizontal hold control potentiometer 66, either directly or by means of a further resistor 68 selected so as to permit tailoring of the time constant provided with capacitor 18 in conjunction with the particular characteristics afforded by individual tubes of the classification described. If the right hand terminal of the horizontal hold control 66 were grounded, the oscillator stage so described would be identical with that disclosed in the previously noted RCA Sales Corporation publication describing its KCS- 179 television receiver.

However—and in accordance with the present invention—the right hand terminal of the control 66 is not grounded, but is instead connected in circuit with a horizontal oscillator disabling circuit. In particular, the disabling circuit will be seen to include a transistor 70 having an emitter electrode directly coupled to ground and a collector electrode connected to the right hand terminal of the control 66 on the one hand, and to ground via a further resistor 72, on the other hand. An additional resistor 74 couples the collector electrode of transistor 70 to a source of B+ voltage, while a capacitor 76 couples the collector electrode to ground. A zener diode 78 and a resistor 80 are serially coupled between a source of +V potential and ground, to develop a positive direct reference voltage at their junction which is coupled to the base electrode of the transistor 70, via a resistor 82, a tapped resistance element of an oscillator disable adjust potentiometer 84 and a further resistor 86. A capacitor 88 couples the variable arm of the potentiometer 84 to ground to aid in the development of a control bias for the transistor.

In accordance with the invention, furthermore, that positive zener reference voltage—which is relatively stable in that it does not substantially vary with applied B+ potential—is combined with a variable negative direct voltage representative of changes in the high voltage developed for the ultor electrode of the cathode-ray picture tube. To that end, a winding 90 is provided around the core of the horizontal output transformer of the receiver 92 to sense the magnitude of the flyback pulse used in developing the necessary high voltage, while a rectifier 94 is coupled to receive that pulse at its cathode electrode, its anode electrode being coupled via a resistor 96 to the bias circuit for the transistor 70 and via a capacitor 98 to ground. As will be readily apparent, the poling of the rectifier 94 and the filtering by capacitor 98 provide the negative direct voltage component at the base electrode of transistor 70 for combination with a positive direct voltage component coupled from the zener reference, with the negative voltage component being proportional to the high voltage potential for the kinescope and with the positive voltage component being relatively stable.

As will be readily appreciated, the switching time of the astable multivibrator type of horizontal oscillator 10 is governed by the R-C time constant of the network including capacitor 18 and its serially coupled resistive elements. Capacitor 58 serves to smooth the transitions of the triode section 14 in going from its non-conductive to its conductive state, while the tank circuit 52, 54 is incorporated to provide a sine wave in response to the ringing when triode section 12 is rendered conductive to sharpen the return transition at the grid of section 14 in accurately setting the timing of the switching cycle normally governed by the changes in exponential waveform at this control grid. Resistor 62 and capacitor 60 are waveshaping components for the signal voltage provided at the plate of section 14 for coupling to an appropriate horizontal output stage.

In the operation of the horizontal oscillator disabling circuit, it will be seen that the transformer winding 90 on the output transformer 92 couples a pulse indicative of the potential subsequently developed by a high voltage rectifier 100 to the rectifier 94 and capacitor 98 combination, which provides the negative direct voltage proportional to the potential developed. This negative voltage is coupled together with a portion of the positive direct voltage developed at the junction of zener diode 78 and resistor 80 to the base electrode of transistor 70; and, for normal operation of the receiver, the combined direct voltage at such electrode is of positive value sufficient to render transistor 70 in saturation. With this arrangement, it will be seen that the effective resistance in series with the capacitor 18 of the R-C time constant network of the oscillator 10 includes resistor 64 (and 68 if present for matching tube characteristics), the resistive portion of the horizontal hold control 66 to the right of its variable arm, and the very low collector-to-emitter impedance of the saturated transistor 70. The control 66 is adjusted at this time for the desired oscillator frequency needed for synchronous horizontal control.

On the other hand, should conditions occur in the receiver which would cause an increase in the high voltage potential (e.g., an increase in line voltage), such change would be sensed by the transformer winding 90 in causing rectifier 94 and capacitor 98 to provide a more negative direct potential for coupling to the transistor 70. When the high voltage pulse monitored by transformer winding 90 reaches that prescribed level as would indicate the occurrence of an X-radiation problem, the increasing negative direct voltage at the base electrode of transistor 70 is made sufficient to bias off that transistor. The effective resistance to ground in series with the timing capacitor 18 is then changed by the effective increase in the collector-to-emitter impedance of the transistor 70. This increase in impedance will serve to adjust the time constant network in such manner as to change the frequency of the horizontal oscillator 10. For increases in line voltage which could cause an increase in the high voltage to the point at which the X-radiation—or even picture tube phosphor destruction—could occur, the resultant monitoring action will be seen to render the reproduced picture unviewable and indicate the necessity for corrective service action to be taken.

In the arrangement of the drawing, it will be appreciated that resistor 72 is incorporated in shunt across the transistor 70 to establish how far the horizontal oscillator will go off frequency during such "fault" condition. It will be noted that this degree of frequency shifting is controlled by the effective impedance presented at the collector electrode of the transistor, as the parallel equivalent of the resistance of resistor 72 and the effective collector-to-emitter impedance of transistor 70 when non-conductive. Control potentiometer 84 is set to predetermine the level at which the high voltage increase will develop sufficient negative direct voltage to disable the oscillator stage 10 by rendering transistor 70 non-conductive.

While applicant does not wish to be limited to any specific set of component values, the following have proved useful in one specific construction of the disclosed configuration:

| | |
|---|---|
| Triode Section 12 | 8FQ7 |
| Triode Section 14 | 8CG7 |
| Resistor 16 | 1 Kilohm |
| Resistor 20 | 33 Kilohms |
| Resistor 32 | 150 Kilohms |
| Resistor 34 | 390 Kilohms |
| Resistor 42 | 560 Kilohms |
| Resistor 46 | 68 Kilohms |
| Resistor 50 | 12 Kilohms |
| Resistor 56 | 15 Kilohms |
| Resistor 62 | 8.2 Kilohms |
| Resistor 64 | 56 Kilohms |
| Resistor 68 | 27 Kilohms |

| | |
|---|---|
| Resistor **72** | 27 Kilohms |
| Resistor **74** | 100 Kilohms |
| Resistor **80** | 39 Kilohms |
| Resistor **82** | 4.7 Kilohms |
| Resistor **86** | 100 Ohms |
| Resistor **96** | 6.8 Kilohms |
| Control Potentiometer **66** | 60 Kilohms |
| Control Potentiometer **84** | 1 Kilohm |
| Capacitor **18** | 390 Micro-microfarads |
| Capacitor **22** | 4700 Micro-microfarads |
| Capacitor **30** | 56 Micro-microfarads |
| Capacitor **40** | 470 Micro-microfarads |
| Capacitor **44** | 3300 Micro-microfarads |
| Capacitor **48** | .056 Microfarads |
| Capacitor **54** | 3900 Micro-microfarads |
| Capacitor **58** | 68 Micro-microfarads |
| Capacitor **60** | 180 Micro-microfarads |
| Capacitor **76** | .01 Microfarads |
| Capacitor **88** | .047 Microfarads |
| Capacitor **98** | 15 Microfarads, **15** Volts |
| B+ | 150 Volts |
| +V | 145 Volts |

While there has been described what is considered to be a preferred embodiment of the present invention, it will be apparent that modifications may be made by those skilled in the art without departing from the scope of the teachings disclosed herein.

What is claimed is:

1. In a television receiver having an image display device, a deflection circuit including an oscillation signal generator, and a high voltage circuit responsive to the generation of such oscillation signals to develop the high voltage needed to operate said display device, and wherein a resistance-capacitance time constant network is also included to set the frequency at which such oscillation signals are generated, the combination therewith of:

means coupled to said deflection output circuit for developing a control signal representative of the high voltage developed and of a first magnitude and polarity when said high voltage is within a prescribed range of operation and of a second magnitude and polarity when said high voltage is in excess of said operating range;

variable impedance means cooperatively coupled to said time constant network to adjust said oscillation frequency as may be desired; and means applying said developed control signals to said variable impedance means, said impedance means cooperating with the resistance component of said time constant network to have substantially little effect on the initially established oscillation frequency in response to the application of said control signal of first magnitude and polarity, but to substantially change said initial frequency in response to the application of said control signal of second magnitude and polarity;

with said change of frequency of said oscillation generator being in a direction to render the image reproduction of said display device unviewable and to thereby provide a protective alert as to the existence of high voltage problems within said receiver.

2. The combination of claim 1 wherein said variable impedance means includes a transistor biased to a first state of conduction by said control signal of first magnitude and polarity, reflecting the development of high voltages within said prescribed operating range, but biased to a second state of conduction by said control signal of second magnitude and polarity, reflecting developed high voltages in excess of the upper limit of said range.

3. The combination of claim 2 wherein a relatively stable bias potential is also applied to said transistor for combination with said control signal developed by said first mentioned means, and of a magnitude and polarity to bias said transistor into saturation when combined with a control signal reflecting the development of high voltages within said range of operation and to bias said transistor to its non-conducting condition when combined with a control signal reflecting the development of high voltages in excess of the upper limit of said range.

4. The combination of claim 3 wherein said variable impedance means also includes a resistance device adjustable to alter the resistance component of said time constant network to initially establish the frequency of said oscillation signal generator, and coupled in series with the input and output electrodes of said transistor for automatically changing the resistance component of said network as said transistor is biased from a saturated condition to a conductive condition in response to the application of said control signal indicating the condition of excess high voltage development.

5. The combination of claim 4 for use in a television receiver including a transformer through which flyback voltage pulses flow in the development of the high voltage needed to operate said display device, and wherein said control signal developing means includes a rectifier capacitor network to monitor the magnitude of said voltage pulses and to develop a unidirectional potential signal representative of the magnitude thereof.

6. The combination of claim 5 wherein said source of relatively stable potential provides a substantially fixed positive direct potential to the base electrode of said transistor and wherein said control signal developing means provides a negative direct voltage thereto, the magnitude of which varies as a function of the amplitude of said flyback pulses reflecting the high voltage generation.

* * * * *

UNITED STATES PATENT OFFICE
CERTIFICATE OF CORRECTION

Patent No. 3,688,031 Dated 8-29-72

Inventor(s) Paul C. Wilmarth & William V. Fitzgerald, Jr.

It is certified that error appears in the above-identified patent and that said Letters Patent are hereby corrected as shown below:

In The Title:

Change "HORIZONTAL OSCILLATOR DISABLING" to
-- HORIZONTAL OSCILLATOR DISABLING CIRCUIT --

Signed and sealed this 8th day of May 1973.

(SEAL)
Attest:

EDWARD M.FLETCHER,JR.
Attesting Officer

ROBERT GOTTSCHALK
Commissioner of Patents